(12) United States Patent
Xu et al.

(10) Patent No.: US 10,903,982 B2
(45) Date of Patent: Jan. 26, 2021

(54) SMART CONTRACT-BASED DATA TRANSFER METHOD AND SYSTEM

(71) Applicant: CHINA UNIONPAY CO., LTD., Shanghai (CN)

(72) Inventors: Yuzhuang Xu, Shanghai (CN); Yu Zhou, Shanghai (CN); Tao Zhu, Shanghai (CN); Xiang Yao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 16/770,897

(22) PCT Filed: Dec. 10, 2018

(86) PCT No.: PCT/CN2018/120084
§ 371 (c)(1),
(2) Date: Jun. 8, 2020

(87) PCT Pub. No.: WO2019/120092
PCT Pub. Date: Jun. 27, 2019

(65) Prior Publication Data
US 2020/0382278 A1   Dec. 3, 2020

(30) Foreign Application Priority Data
Dec. 18, 2017   (CN) .......................... 2017 1 1363240

(51) Int. Cl.
*H04L 29/06*   (2006.01)
*H04L 9/06*   (2006.01)
(Continued)

(52) U.S. Cl.
CPC .......... *H04L 9/0637* (2013.01); *G06K 9/6256* (2013.01); *H04L 9/0825* (2013.01);
(Continued)

(58) Field of Classification Search
CPC ... H04L 9/0637; H04L 9/3263; H04L 9/0825; H04L 9/0866; H04L 2209/38; G06K 9/6256
See application file for complete search history.

(56) References Cited

U.S. PATENT DOCUMENTS

2017/0155515 A1* 6/2017 Androulaki ............ H04L 9/008
2017/0359374 A1 12/2017 Smith et al.
(Continued)

FOREIGN PATENT DOCUMENTS

| CN | 106559211 A | 4/2017 |
| CN | 106779704 A | 5/2017 |

(Continued)

*Primary Examiner* — Joseph P Hirl
*Assistant Examiner* — Ka Shan Choy
(74) *Attorney, Agent, or Firm* — The Ollila Law Group LLC

(57) ABSTRACT

The present disclosure relates to a smart contract-based data transfer method, comprising the steps of: a data source encrypting data to be transferred based on a first mechanism to form encrypted data, and sending the encrypted data to a smart contract terminal; the smart contract terminal decrypting the encrypted data based on a second mechanism corresponding to the first mechanism to form the decrypted data, and processing the decrypted data by using at least one logic unit to form the resulting data; and the smart contract terminal sending the resulting data to a data-related party; wherein the at least one logic unit executes an instruction set to implement a contract logic, and the instruction set is stored in a blockchain.

14 Claims, 1 Drawing Sheet

(51) Int. Cl.
*H04L 9/08* (2006.01)
*H04L 9/32* (2006.01)
*G06K 9/62* (2006.01)

(52) U.S. Cl.
CPC .......... *H04L 9/0866* (2013.01); *H04L 9/3263* (2013.01); *H04L 2209/38* (2013.01)

(56) References Cited

U.S. PATENT DOCUMENTS

2018/0247063 A1 8/2018 Li
2019/0103958 A1* 4/2019 Wu ..................... G06F 16/903

FOREIGN PATENT DOCUMENTS

| | | |
|---|---|---|
| CN | 106845960 A | 6/2017 |
| CN | 106941487 A | 7/2017 |
| CN | 107273759 A | 10/2017 |
| CN | 107290965 A | 10/2017 |
| CN | 107294709 A | 10/2017 |
| CN | 107317730 A | 11/2017 |
| CN | 108282459 A | 7/2018 |
| EP | 3576033 A1 | 12/2019 |
| WO | WO-2018058441 A1 * | 4/2018 ........... H04L 9/0643 |

* cited by examiner

SMART CONTRACT-BASED DATA TRANSFER METHOD AND SYSTEM

CROSS-REFERENCE TO RELATED APPLICATIONS

This application is a U.S. national stage application of International Patent Application PCT/CN2018/120084, filed Dec. 10, 2018, and claims priority to and benefit of China Patent Application No. 201711363240.8, titled "SMART CONTRACT-BASED DATA TRANSFER METHOD AND SYSTEM", filed Dec. 18, 2017, which are herein incorporated by reference in their entirety.

FIELD OF THE DISCLOSURE

The present disclosure relates to the technical field of data transfer, and more particularly relates to a smart contract-based data transfer method and system.

BACKGROUND ART

Blockchain is a highly credible technical means for information sharing. Different organizations may exchange data and share information through the blockchain, thereby breaking data barriers and realizing a rapid flow of data between organizations.

In the process of data sharing and flow, it is inevitable to encounter the problem of protecting confidential data or private data. These data cannot be shared directly by enterprises and organizations with other organizations and individuals. How to ensure confidentiality, privacy and security of data in the process of collaborative data processing and data sharing is one of the factors restraining the widespread application of blockchain technology in the industry.

In the prior art, a method for protecting data in a blockchain system generally involves encrypting and storing confidential or private data in a blockchain, or separating private data from non-private data for selective disclosure or transfer. For example, organization A sends data to organization B. Organization A first encrypts the data with organization B's public key, and places the encrypted data in a blockchain. Then, organization B obtains ciphertext data from the blockchain system, and decrypts the data using its own private key to get the plaintext.

Another method for protecting data involves data isolation. For example, a fabric system isolates data through a channel mechanism. This requires two or more parties sharing data to establish their own channels so that the data is only transmitted between organizations within the channels, and will not be transmitted to organizations beyond the channels, thereby achieving data isolation.

However, the above methods for protecting data in the blockchain still have some defects. For example, if the data is encrypted and stored in a blockchain and only available by using a private key, data sharing in this manner would require maintaining a complex public-private key system and a trust center, which limits the scope of data use. As for the method based on channel isolation, it requires maintaining a plurality of channels. Moreover, the circulation of confidential/privacy data after it is decrypted is beyond the control of the data source party, so there may be a risk of data leakage.

SUMMARY

The embodiments aim to provide a smart contract-based data transfer method, which is capable of overcoming the defects of the prior art described above, and promoting confidential/private data protection.

In order to achieve the above objective, one of the embodiments provides a technical solution as follows:

A smart contract-based data transfer method, comprising the steps of: a) a data source encrypting data to be transferred based on a first mechanism to form encrypted data, and sending the encrypted data to a smart contract terminal; b) the smart contract terminal decrypting the encrypted data based on a second mechanism corresponding to the first mechanism to form the decrypted data, and processing the decrypted data by using at least one logic unit to form the resulting data; and c) the smart contract terminal sending the resulting data to a data-related party; wherein the at least one logic unit executes an instruction set to implement a contract logic, and the instruction set is stored in a blockchain.

One of the embodiments further discloses a smart contract-based data transfer system, comprising: a data source, configured to encrypt data to be transferred based on a first mechanism to form encrypted data, and send the encrypted data to a smart contract terminal; the smart contract terminal, configured to decrypt the encrypted data based on a second mechanism corresponding to the first mechanism to form the decrypted data, and process the decrypted data by using at least one logic unit to form the resulting data; and a data-related party, configured to receive the resulting data from the smart contract terminal; wherein the smart contract terminal comprises at least one logic unit, configured to execute an instruction set to implement a contract logic, and wherein the instruction set is stored in a blockchain.

The smart contract-based data transfer method and system according to each embodiment of the present disclosure may process data by utilizing a smart contract terminal. The instructions executed by the smart contract terminal are stored in accordance with the blockchain so that they cannot be tampered with or forged. This makes the contract logic implemented by the smart contract terminal secure, reliable and irreversible. As a result, the original data can be completely blocked from the data-related party and any other external party. On the other hand, as the embodiments of the present disclosure can carry out data transfer in a reliable and secure manner with a relatively simple mode and a relatively inexpensive cost, they are worthy of being spread in the field.

DETAILED DESCRIPTION

Specific details are set forth in the following description to facilitate a thorough understanding of embodiments of the disclosure. However, a person skilled in the art would know it clearly that the embodiments of the present disclosure can be implemented even without these specific details. In the present disclosure, specific numerical references such as "first element" and "second device" can be made. These specific numerical references should not be construed as necessarily obeying their literal order, but rather should be understood as the "first element" being different from the "second element".

The specific details provided by the present disclosure are merely exemplary, and these specific details may vary, but still fall within the spirit and scope of the present disclosure. The term "couple" is defined as directly connecting to a component or indirectly connecting to a component via another component.

Preferred embodiments of the method, system, and device suitable for achieving the concept of the present disclosure are described below by reference to the drawings. Although each embodiment is directed to a single combination of elements, it shall be understood that the present disclosure comprises all possible combinations of elements disclosed herein. Therefore, if one embodiment includes elements A, B, and C, and another embodiment includes elements B and D, the present disclosure shall also be deemed as comprising other remaining combinations of A, B, C or D, even though these combinations may not be explicitly disclosed.

Figure 1:
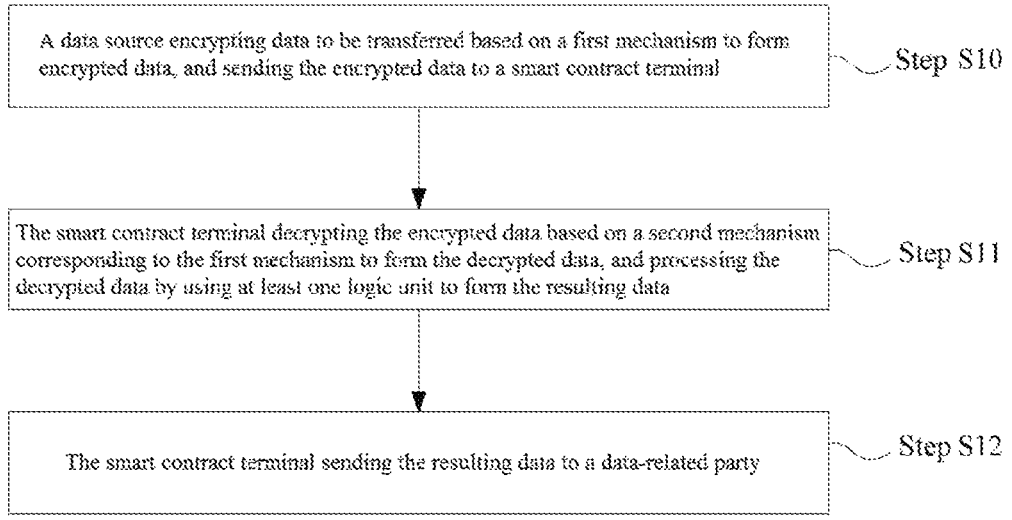
FIG. 1 is a schematic flow chart of a smart contract-based data transfer method according to one embodiment of the present disclosure.

As illustrated in FIG. 1, one embodiment of the present disclosure provides a smart contract-based data transfer method, comprising the following steps:

Step S10: a data source encrypting data to be transferred based on a first mechanism to form encrypted data, and sending the encrypted data to a smart contract terminal.

Here, as an example, the first mechanism may be implemented as a public key under a key mechanism. Specifically, the data source requests a public key from the smart contract terminal, and the smart contract terminal generates a public key in response to the request and issues it to the data source. The public key and the private key are generated in pairs. The public key is issued to the data source, while the private key cannot be issued, but only stored locally in the smart contract terminal.

As an alternative means of implementation, asymmetric encryption algorithms such as RSA, Elgamal, knapsack algorithm and ECC, or symmetric encryption algorithms such as DES and RC5 can be employed to simply replace the public-private key generation algorithm.

Furthermore, the smart contract terminal may require the data source to provide a first digital certificate for verifying the data source, and only transfer data when the first digital certificate is authenticated. Likewise, in the following step S12, the smart contract terminal may require the data-related party to provide a second digital certificate for verifying the data-related party, and only transfer data when the second digital certificate is authenticated. It can be understood that the first digital certificate and the second digital certificate may have certain correlation which enables the data source terminal to ensure only the authenticated data-related party gets access to the resulting data via the smart contract terminal. This means helps to further protect data confidentiality or privacy.

Preferably, the data source and the smart contract terminal transmit the encrypted data based on a SSL/TLS protocol. Alternatively, other reliable means requiring the establishment of a communication link may also be selected for communication.

Step S11: the smart contract terminal decrypting the encrypted data based on a second mechanism corresponding to the first mechanism to form the decrypted data, and processing the decrypted data by using at least one logic unit to form the resulting data.

In the above step, the second mechanism corresponds to the first mechanism. As an example, the second mechanism may be implemented as a private key under a key mechanism. Specifically, the private key is generated by the smart contract terminal in the manner that the private key is paired with the public key, and used by the smart contract terminal for decryption. The logic unit herein may refer to a single unit or a plurality of units. In the case where a plurality of logic units is used in combination, the smart contract terminal can implement a relatively complex contract logic.

Step S12: the smart contract terminal sending the resulting data to a data-related party.

According to the above embodiment, each logic unit as mentioned above executes an instruction set stored in the blockchain to implement a contract logic. The blockchain sets up a consensus mechanism between different nodes to effectively verify validity of the instructions. Owing to the characteristics of the blockchain technology per se, the above instructions cannot be tampered with or forged, thereby making the contract logic implemented by the smart contract terminal secure, reliable, and irreversible.

The resulting data output by the smart contract terminal to the data-related party has no mathematical or semantic correlation with the data to be transferred. This means the data-related party only having access to the resulting data would not be able to (even partially) reproduce or interpret the original data (i.e., the data to be transferred); in other words, the confidential/privacy data is blocked from the data-related party, and thus is securely protected.

As a further improvement to the above embodiment, the above instruction set comprises a first instruction and a second instruction. The first instruction is executed to implement a training logic based on a first portion of the decrypted data, wherein the training logic is configured to train a prediction model. The second instruction is executed to implement a prediction logic based on a second portion of the decrypted data; wherein the prediction logic is configured to use the prediction model to output a prediction result.

As a specific example, data sources A, B and C, data-related party D, and a smart contract terminal are provided to implement a training algorithm for machine learning. Data sources A, B and C provide training samples; the requester requests data results; the smart contract terminal may implement a specific training logic and a specific prediction logic by executing a training algorithm for machine learning. However, it can be understood that in different application scenarios, the smart contract terminal may also implement any applicable data processing logic, as required.

An example of the training logic is as follows: (1) The data source requests the smart contract terminal to issue a public key. After the smart contract terminal returns the public key, the requester (i.e., the data source) encrypts a training sample (a first portion of the decrypted data) using the public key, and sends the encrypted training sample to the smart contract terminal. (2) The smart contract terminal decrypts the encrypted training sample using its own private key, and transfers the decrypted training sample to a logic unit in the smart contract terminal to further train a prediction model.

An example of the prediction logic is as follows: (1) The requester (i.e. the data source) requests the smart contract terminal to issue a public key. After the smart contract returns the public key, the requester encrypts a sample to be predicted (a second portion of the decrypted data) using the public key, and sends the encrypted sample to be predicted to the smart contract terminal. (2) The smart contract terminal decrypts using its own private key, and sends the decrypted sample to be predicted to a prediction model for generating a prediction result. The prediction model can be embodied as another logic unit in the smart contract terminal.

Finally, the prediction model provides the prediction result to the data-related party D.

Preferably, there are three logic units: a first logic unit configured to execute the instruction to implement a first logic; a second logic unit configured to execute the instruction to implement a second logic; and a third logic unit configured to combine the first logic with the second logic to output the resulting data. Among them, the combination performed by the third logic unit includes, but is not limited to, logical addition, subtraction, and operation, XOR, XNOR and the like. By analogy, there can be more logic units which are combined with each other in more complicated ways. In this manner, the smart contract terminal can implement a complex contract logic.

Figure 2:
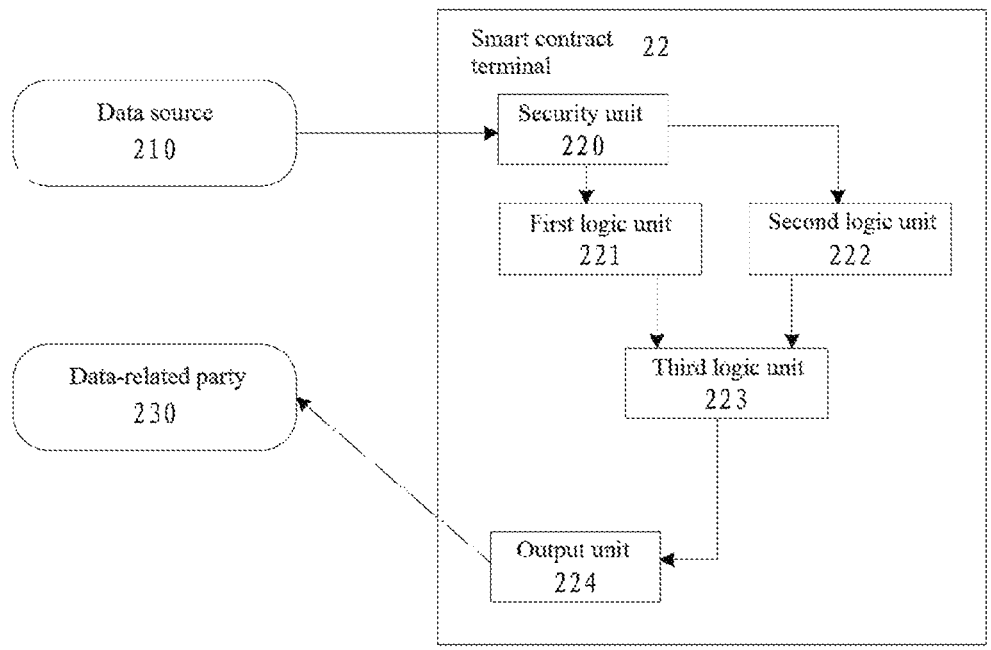
FIG. 2 is a schematic diagram of a module structure of a smart contract-based data transfer system according to another embodiment of the present disclosure.

Another embodiment of the present disclosure is illustrated in FIG. 2. A smart contract-based data transfer system comprises a plurality of data sources 210 (for simplicity, only one is shown in the drawing), a smart contract terminal 22 and a plurality of data-related parties 230 (only one is shown in the drawing).

Each data source 210 encrypts its own data to be transferred based on the corresponding first mechanism to form the corresponding encrypted data, and sends various encrypted data to the smart contract terminal 22.

The smart contract terminal comprises a security unit 220, first, second and third logic units 221, 222 and 223, and an output unit 224. The first and second logic units 221 and 222 are each coupled to the security unit 220; the third logic unit 223 is coupled to the first and second logic units 221 and 222; and the output unit 224 is coupled to the third logic unit 223.

Specifically, the security unit 220 decrypts the above encrypted data based on a second mechanism corresponding to the first mechanism to form the decrypted data. As an example, the first and second mechanisms are respectively public and private keys generated in pairs under the same key system.

The first logic unit 221 executes a part of the instructions in the instruction set to implement a first logic. The second logic unit 222 executes another part of the instructions to implement a second logic. The third logic unit 223 combines the first logic with the second logic to finally generate and output the resulting data. The above instruction set is stored in accordance with the blockchain.

Each data-related party 230 can receive the respective resulting data from the output unit 224 in the smart contract terminal 22.

In the embodiment, by arranging a plurality of logic units 221, 222 and 223 and combining them, the smart contract terminal 22 can implement a complex contract logic. As the instruction set is stored in the blockchain, the instructions contained therein cannot be tampered with or forged, and are irreversible, which makes it impossible for any other party, including the data-related party, to gain access to or reproduce the data originally input to the smart contract terminal 22.

It can be understood that although the security unit 220 and the output unit 224 are shown in FIG. 2, they are not indispensable parts of the above embodiment. In fact, their functions can be performed by being incorporated into, for example, the first logic unit 221 or the third logic unit 223, respectively. Alternatively, the security unit 220 and the output unit 224 may be implemented as a single logic unit which only concerns functionality of encryption, decryption and data communication.

The above embodiment may be applied to the field of financial services, where various instructions deployed to the blockchain help to enable the smart contract terminal 22 to carry out statistical analysis of relevant financial data.

As a simple example, a financial institution requests a public key from the smart contract terminal 22, and the smart contract terminal 22 returns the public key. The financial institution uses the returned public key to encrypt remittance records, and sends the encrypted data to the smart contract terminal 22. The smart contract terminal 22 decrypts the encrypted remittance records using its own private key, and obtains authentic remittance records. Then, it compiles statistics of the remittance records. If a remittance record belongs to Bank A, the statistics of Bank A is increased by 1; if a remittance record belongs to Bank B, the statistics of Bank B is increased by 1; if a remittance record belongs to Bank C, the statistics of Bank C is increased by 1. Subsequently, Banks A, B and C (data-related parties) request statistical results from the smart contract terminal 22. If the statistics are completed, the smart contract terminal 22 will provide corresponding statistical results to Banks A, B, and C, respectively.

As another improvement to the above embodiment, each logic unit 221, 222 or 223 merely converts the original data in form, rather than analyzes or preprocesses or reuses the original data. In this manner, the data is encrypted and deformed several times during the transfer. Then, only the data-related party can reproduce the original data; any other external party connected to the communication network related to the smart contract terminal cannot decrypt and access the original data, even if the contract logic implemented by the smart contract terminal 22 is extremely simple.

In some embodiments of the present disclosure, at least a part of the above system can be implemented by a group of distributed computing devices connected to a communication network, or implemented on the basis of a "cloud". In such a system, a plurality of computing devices operate together to provide services using their shared resources.

The "cloud"-based implementation has one or more advantages including: openness, flexibility and expandability, central management, reliability, scalability, optimization of computing resources, capability of aggregating and analyzing information of a plurality of users, capability of connection across different geographic regions, and capability of using a plurality of mobile or data network operators for network connectivity.

Embodiments of the present disclosure provide a computer storage medium for storing computer-executable instructions as well. These computer-executable instructions are configured to, when executed by a processor, implement the method according to the above embodiment.

The above description only concerns the preferred embodiments of the present disclosure, rather than limits the protection scope of the present disclosure. A person skilled in the art may make variant designs without departing from the spirit of the present disclosure and the accompanying claims.

The invention claimed is:

1. A smart contract-based data transfer method, comprising the steps of:
   a) a data source encrypting data to be transferred based on a first mechanism to form encrypted data, and sending the encrypted data to a smart contract terminal;
   b) the smart contract terminal decrypting the encrypted data based on a second mechanism corresponding to the first mechanism to form the decrypted data, and processing the decrypted data by using at least one logic unit to form the resulting data; and c) the smart contract terminal sending the resulting data to a data-related party;
wherein the at least one logic unit executes an instruction set to implement a contract logic, and the instruction set is stored in a blockchain, the resulting data has no correlation with the data to be transferred, and the instruction set comprises:
a first instruction, executed to implement a training logic based on a first portion of the decrypted data, wherein the training logic is configured to train a prediction model;
a second instruction, executed to implement a prediction logic based on a second portion of the decrypted data, wherein the prediction logic is configured to use the prediction model to output a prediction result.

2. The method of claim 1, wherein the at least one logic unit comprises:
a first logic unit, configured to execute the instruction to implement a first logic;
a second logic unit, configured to execute the instruction to implement a second logic; and
a third logic unit, configured to combine the first logic with the second logic to output the resulting data.

3. The method according to claim 1, wherein:
the first mechanism comprises a public key, wherein the public key is generated by the smart contract terminal in response to a request from the data source to the smart contract terminal and issued to the data source;
the second mechanism comprises a private key, wherein the private key is generated by the smart contract terminal in the manner that the private key is paired with the public key.

4. The method of claim 1, wherein:
the step a) further comprises:
the smart contract terminal requiring the data source to provide a first digital certificate for verifying the data source;
the step c) further comprises:
the smart contract terminal requiring the data-related party to provide a second digital certificate for verifying the data-related party.

5. A smart contract-based data transfer system, comprising:
a data source, configured to encrypt data to be transferred based on a first mechanism to form encrypted data, and send the encrypted data to a smart contract terminal;
the smart contract terminal, configured to decrypt the encrypted data based on a second mechanism corresponding to the first mechanism to form the decrypted data, and process the decrypted data by using at least one logic unit to form the resulting data; and
a data-related party, configured to receive the resulting data from the smart contract terminal;
wherein the smart contract terminal comprises at least one logic unit, configured to execute an instruction set to implement a contract logic, and wherein the instruction set is stored in a blockchain, the resulting data has no correlation with the data to be transferred, and the instruction set comprises:
a first instruction, executed to implement a training logic based on a first portion of the decrypted data; wherein the training logic is configured to train a prediction model;
a second instruction, executed to implement a prediction logic based on a second portion of the decrypted data; wherein the prediction logic is configured to use the prediction model to output a prediction result.

6. The system of claim 5, wherein the at least one logic unit comprises:
a first logic unit, configured to execute the instruction to implement a first logic;
a second logic unit, configured to execute the instruction to implement a second logic; and
a third logic unit, configured to combine the first logic with the second logic to output the resulting data.

7. The system of claim 6, wherein the system is deployed on the basis of a distributed system.

8. The system of claim 5, wherein:
the first mechanism comprises a public key, wherein the public key is generated by the smart contract terminal in response to a request from the data source to the smart contract terminal and issued to the data source;
the second mechanism comprises a private key, wherein the private key is generated by the smart contract terminal in the manner that the private key is paired with the public key.

9. The system of claim 8, wherein the system is deployed on the basis of a distributed system.

10. The system claim 5, wherein the system is deployed on the basis of a distributed system.

11. A computer storage medium for storing computer-executable instructions, wherein the computer-executable instructions are configured to, when executed by a processor, perform steps of:
a) a data source encrypting data to be transferred based on a first mechanism to form encrypted data, and sending the encrypted data to a smart contract terminal;
b) the smart contract terminal decrypting the encrypted data based on a second mechanism corresponding to the first mechanism to form the decrypted data, and processing the decrypted data by using at least one logic unit to form the resulting data; and
c) the smart contract terminal sending the resulting data to a data-related party;
wherein the at least one logic unit executes an instruction set to implement a contract logic, and the instruction set is stored in a blockchain, the resulting data has no correlation with the data to be transferred, and the instruction set comprises;
a first instruction, executed to implement a training logic based on a first portion of the decrypted data, wherein the training logic is configured to train a prediction model;
a second instruction, executed to implement a prediction logic based on a second portion of the decrypted data, wherein the prediction logic is configured to use the prediction model to output a prediction result.

12. A non-transitory computer storage medium for storing computer-executable instructions of claim 11, wherein the at least one logic unit comprises:
a first logic unit, configured to execute the instruction to implement a first logic;
a second logic unit, configured to execute the instruction to implement a second logic; and
a third logic unit, configured to combine the first logic with the second logic to output the resulting data.

13. A non-transitory computer storage medium for storing computer-executable instructions of claim 11, wherein:
the first mechanism comprises a public key, wherein the public key is generated by the smart contract terminal in response to a request from the data source to the smart contract terminal and issued to the data source;

the second mechanism comprises a private key, wherein the private key is generated by the smart contract terminal in the manner that the private key is paired with the public key.

14. A non-transitory computer storage medium for storing computer-executable instructions of claim 11, wherein:

the step a) further comprises;

the smart contract terminal requiring the data source to provide a first digital certificate for verifying the data source;

the step c) further comprises;

the smart contract terminal requiring the data-related party to provide a second digital certificate for verifying the data-related party.

* * * * *